(12) United States Patent
Brun

(10) Patent No.: US 12,461,157 B2
(45) Date of Patent: Nov. 4, 2025

(54) ANOMALY IDENTIFICATION IN AN ELECTROCHEMICAL SYSTEM

(71) Applicant: ELECTRICITE DE FRANCE, Paris (FR)

(72) Inventor: Emeric Brun, Avon (FR)

(73) Assignee: ELECTRICITE DE FRANCE, Paris (FR)

( * ) Notice: Subject to any disclaimer, the term of this patent is extended or adjusted under 35 U.S.C. 154(b) by 404 days.

(21) Appl. No.: 18/071,107

(22) Filed: Nov. 29, 2022

(65) Prior Publication Data
US 2023/0168305 A1 Jun. 1, 2023

(30) Foreign Application Priority Data
Nov. 29, 2021 (FR) ........................................ 2112656

(51) Int. Cl.
*G01R 31/367* (2019.01)
*G01R 31/392* (2019.01)
*G01R 31/396* (2019.01)

(52) U.S. Cl.
CPC ......... *G01R 31/367* (2019.01); *G01R 31/392* (2019.01); *G01R 31/396* (2019.01)

(58) Field of Classification Search
CPC .. G01R 31/367; G01R 31/392; G01R 31/396; G01R 31/3842; G01R 31/3648
See application file for complete search history.

(56) References Cited

U.S. PATENT DOCUMENTS

| | | | | |
|---|---|---|---|---|
| 5,218,286 A | * | 6/1993 | VanDunk | H02J 7/0013 320/DIG. 19 |
| 7,869,924 B2 | * | 1/2011 | Wu | B60K 6/547 475/120 |
| 9,889,752 B2 | * | 2/2018 | Zhou | B60L 58/12 |
| 10,014,702 B2 | * | 7/2018 | Vogel | G01R 31/367 |
| 10,220,835 B2 | * | 3/2019 | Jorgensen | B60W 20/50 |
| 2016/0190827 A1 | * | 6/2016 | Ezawa | H02J 7/005 320/136 |

FOREIGN PATENT DOCUMENTS

| | | |
|---|---|---|
| CN | 111308382 A | 6/2020 |
| FR | 2990516 A1 | 11/2013 |
| FR | 3018360 A1 | 9/2015 |

OTHER PUBLICATIONS

Search Report issued on Jul. 14, 2022, with machine translation, in corresponding French Application No. 2112656, 19 pages.

* cited by examiner

*Primary Examiner* — Tung S Lau
(74) *Attorney, Agent, or Firm* — Maier & Maier, PLLC

(57) ABSTRACT

A method for diagnosing an electrochemical system, including: (a) collecting timestamped measurement data, (b) deducing for each instant: a reference state of charge of the system, a state of charge deviation of the first element having the highest voltage, a state of charge deviation of the second element having the lowest voltage, (c) grouping the data sets by ranges of values of the reference state of charge, and (d) assigning to each data pair composed of the identifier of the electrochemical element and the corresponding state of charge deviation: a diagnostic function among pre-established functions.

11 Claims, 6 Drawing Sheets

ANOMALY IDENTIFICATION IN AN ELECTROCHEMICAL SYSTEM

FIELD

This disclosure relates to the field of electrochemical devices for storing energy, and more particularly to the diagnosis of batteries, or accumulators.

BACKGROUND

It is known to monitor the behavior and performance of batteries over time, for example by measuring certain properties of a battery in order to deduce its state. One of the performance parameters of an electrochemical device is a variable called its "state of health", or SOH. This parameter, having no units and generally expressed as a percentage, is defined as the ratio of the actual electrical capacity $C_{actual}$ of the element being tested to the rated electrical capacity $C_{rated}$ (or the capacity at start of life) of the same element. The equation below represents this parameter:

$$SOH = \frac{C_{actual}}{C_{rated}} \times 100 \qquad \text{[Math. 1]}$$

Another useful parameter for qualifying the state of an electrochemical device is the "state of charge", or SOC. This parameter also has no units and is usually expressed as a percentage. The SOC is defined as the ratio of the actual available charge $Q_t$ of the tested item to the maximum charge $Q_{max,t}$ of the same item in its current state of health. The equation below represents this parameter:

$$SOC = \frac{Q_t}{Q_{max,t}} \times 100 \qquad \text{[Math. 2]}$$

It is possible to simulate the operation of electrochemical systems and elements by building theoretical models. In this case, the relevance of the virtual results depends on the quality of the modeling. It is also possible to measure the properties of an electrochemical element (therefore actual) relating to its state of health. Generally, this requires imposing specific stresses on it (characterization cycles). This requires time and special testing equipment. The known methods even tend to degrade the tested elements and their state of health that one wishes to assess. In general, an electrochemical element subjected to such tests is no longer operational during the period of the tests. In other words, this is carried out during a maintenance period, or at least outside of a normal operating state.

Some methods can be implemented during an operational phase of the device but only under certain operating conditions, for example when charging and/or discharging is complete. Others involve operators entering data other than measurement data of the device.

In practice, monitoring and control systems for electrochemical systems exist, often called BMS for "Battery Management System". A BMS receives parameters and measurements as inputs during nominal operation of an electrochemical system and outputs diagnostic data, for example warning signals, and some measurement data intended for higher control levels, often called the "monitoring platform". Typically, a BMS is locally associated with a single electrochemical system and the diagnostic data from several BMSs are collected remotely in a centralized manner on the monitoring platform. In practice, this means that only part of the data is available at the monitoring platform downstream of the BMS, and often after a delay (not in real time), not all of the measurements locally made and processed by each BMS. For example, even if a BMS collects measurements at a high level of detail, separately for each component element of an electrochemical system, the data that are output from the BMS concern the system as a whole rather than each element considered as such.

It would theoretically be possible to modify existing BMSs to implement new diagnostic methods. However, this would involve a large number of direct interventions on each electrochemical system. It would theoretically be possible to centralize, remotely and in real time, all the data measured locally at the electrochemical systems in order to implement new diagnostic methods at the management platform. However, the volume of data to be transmitted and then processed at the management platform would require oversizing the existing infrastructures, particularly in terms of network and computing resources. There is therefore a need for a diagnostic method that is more precise than existing ones and which would not require more measurement data than what is available as output from existing BMSs. In addition, diagnostics independent of those provided by the BMSs would make it possible to provide synergy in the management of the systems.

SUMMARY

This disclosure improves the situation.

A diagnostic method for diagnosing an actual electrochemical system is proposed, implemented by computer means, said system being composed of a plurality of electrochemical elements electrically connected in series. The method comprises:

a. collecting measurement data from the system at a plurality of instants, said data being timestamped and including, for each instant, at least:
  a voltage and a current across the terminals of the system,
  the maximum voltage, across the terminals of a first electrochemical element, among the voltages across the terminals of each of the electrochemical elements, associated with an identifier of said first electrochemical element,
  the minimum voltage, across the terminals of a second electrochemical element, among the voltages across the terminals of each of the electrochemical elements, associated with an identifier of said second electrochemical element, b. deducing, from said measurement data, for each instant:
  a reference state of charge of the system,
  a first state of charge deviation of the first element relative to the reference state of charge of the system,
  a second state of charge deviation of the second element relative to the reference state of charge of the system,
  so as to obtain, for each instant, a data set associated with a pair of elements of interest formed of the first and second elements, c. grouping the data sets by ranges of values of the reference state of charge of each data set, so as to retain a representative data set by ranges of values of the reference state of charge, d. assigning to each data pair composed of the identifier of the electrochemical element and the corresponding state of charge deviation:

no diagnostic function,
or
at least one of the following diagnostic functions:
an identification function for identifying at least one electrochemical element having a difference in residual capacity compared to a rated residual capacity of the electrochemical elements of the system, that is within the range of values of the reference state of charge;
a quantification function for quantifying said difference(s) in residual capacity;
a quantification function for quantifying the maximum imbalance between the chemical elements of the system.

According to another aspect, a computer program is provided comprising instructions for implementing all or part of a method as defined herein when this program is executed by a processor. According to another aspect, a non-transitory, computer-readable storage medium is provided on which such a program is stored.

Such a method makes it possible to carry out a differentiated and precise diagnosis of two physical phenomena harmful to the proper operation of electrochemical systems, based on conventional measurement data. Such a diagnosis makes it possible to implement targeted corrective measures, in a reliable manner, in order to improve the subsequent performance of the systems, their durability, and the safety of nearby equipment and operators. "Differentiated diagnosis" is understood here to mean that it becomes possible to detect and identify phenomena differentiated from each other and also that it is possible to identify the source of an anomaly at the precise scale of one or more component elements of the electrochemical system rather than at the encompassing and imprecise scale of the system as a whole. "Conventional measurement data" is understood here to mean data which are conventionally available during functional operation (not only during diagnostic, maintenance, or experimental phases), including downstream of the BMSs. In other words, said measurement data can be obtained without the need to impose specific operating conditions, or to add additional measurement devices to existing operational systems. It concerns, for example, the current flowing through the system and the voltages across the terminals of the system elements.

The features set forth in the following paragraphs may optionally be implemented, independently of each other or in combination with each other:

The grouping of data sets comprises calculating, for each range of values of the state of charge:
a first representative value of the first state of charge deviations deduced from the measurement data, said first representative value corresponding to an unweighted mean, a weighted mean, or quantiles, such as a median, of the first state of charge deviations,
a second representative value of the second state of charge deviations deduced from the measurement data, said second representative value corresponding to an unweighted mean, a weighted mean, or a median, of the second state of charge deviations, said first and second representative values calculated for each range of values of the state of charge being those retained for the assigning of diagnostic functions or of no diagnostic function.

The number of occurrences of electrochemical element identifiers among the measurement data collected is a parameter in assigning diagnostic functions or in assigning no diagnostic function.

Each data pair composed of the electrochemical element identifier and the corresponding state of charge deviation may also be assigned the following function:
an identification function for identifying the elements involved in the maximum imbalance between the chemical elements of the system.

The method further comprises a diagnostic step:
e. generating at least one of the following anomaly signals on the basis of the data pairs composed of the electrochemical element identifier and the corresponding state of charge deviation:
an identification of at least one electrochemical element having a difference in residual capacity compared to a rated residual capacity of the electrochemical elements of the system within the range of values of the reference state of charge;
a quantification of said difference(s) in residual capacity;
a quantification of the maximum imbalance between the chemical elements of the system.

The method further comprises a step of triggering at least one corrective measure in response to at least one of said anomaly signals.

The data pairs composed of the electrochemical element identifier and the corresponding state of charge deviation to which a quantification function for quantifying said difference(s) in residual capacity is assigned, are used together in constructing a linear regression model, then a quantification of a residual capacity anomaly is implemented as a function of the slope value of said linear regression model.

The data pairs composed of the electrochemical element identifier and the corresponding state of charge deviation to which a quantification function for quantifying the maximum imbalance between the chemical elements of the system is assigned, are used together to calculate a mean, weighted or not, or quantiles, such as a median, of the values of the first and second state of charge deviations.

The data sets are obtained for a plurality of instants distributed over a plurality of charge and/or discharge cycles, complete or partial, of said electrochemical system.

BRIEF DESCRIPTION OF THE DRAWINGS

Other features, details, and advantages will become apparent upon reading the detailed description below, and upon analyzing the appended drawings, in which.

DETAILED DESCRIPTION

An electrochemical system is defined as an assembly composed of a plurality of electrochemical elements electrically connected in series. Such systems are sometimes called a "rack" or "string". Each electrochemical element, or "cell", may itself be composed of one or more sub-elements connected to each other in series, in parallel, or in a combination of connections in series and in parallel. Here, each chemical element is considered to have a unique voltage across its terminals at all times.

In the following, two physical properties are distinguished within electrochemical systems: the residual capacity of each element and the imbalance between the elements in the state of charge of the system.

Ideally, we want to quantify and identify the residual capacities of the elements, i.e. assign a residual capacity value to each element of the system. As they are used, electrochemical systems undergo aging mechanisms which, at the macroscopic level, result in a drop in their capacity. Connected in series, all the elements are subject to the same charge/discharge current, excluding balancing currents (described below) and any self-consumption of the BMS (negligible because several orders of magnitude lower than the charge/discharge current). An element (or cell) having a lower residual capacity than the other elements of the system will therefore charge/discharge faster than the other elements. In a case where the system is regulated by a nominal voltage threshold per element (and in the absence of balancing current), the weakest element limits the performance of the system as a whole. In a case where the system is regulated by a common voltage threshold (for example an average) for all the elements (and in the absence of a balancing current), the lowest element is likely to operate outside the nominal voltage ranges, increasing the risk of malfunction, deterioration, and therefore the safety of the assembly. This below-average capacity is irreversible: the corresponding elements must be identified and their state quantified in order to implement appropriate corrective actions.

We also want to quantify the maximum imbalance between the elements of the system. Indeed, any real system is imperfect and therefore presents an imbalance. Although all the elements of an assembly in series are subjected to the same current, the differences in performance of the elements (self-discharge rate, coulombic efficiency) as well as locally extracted currents such as those related to balancing or self-consumption of the BMS, lead to progressive misalignment in the state of charge of the various elements. For the same reasons as those explained above, imbalance of the elements leads to a drop in performance of the assembly and/or a safety risk. This imbalance in the state of charge is a reversible phenomenon that can be corrected by performing a balancing action, for example by generating balancing currents.

Figure 1:
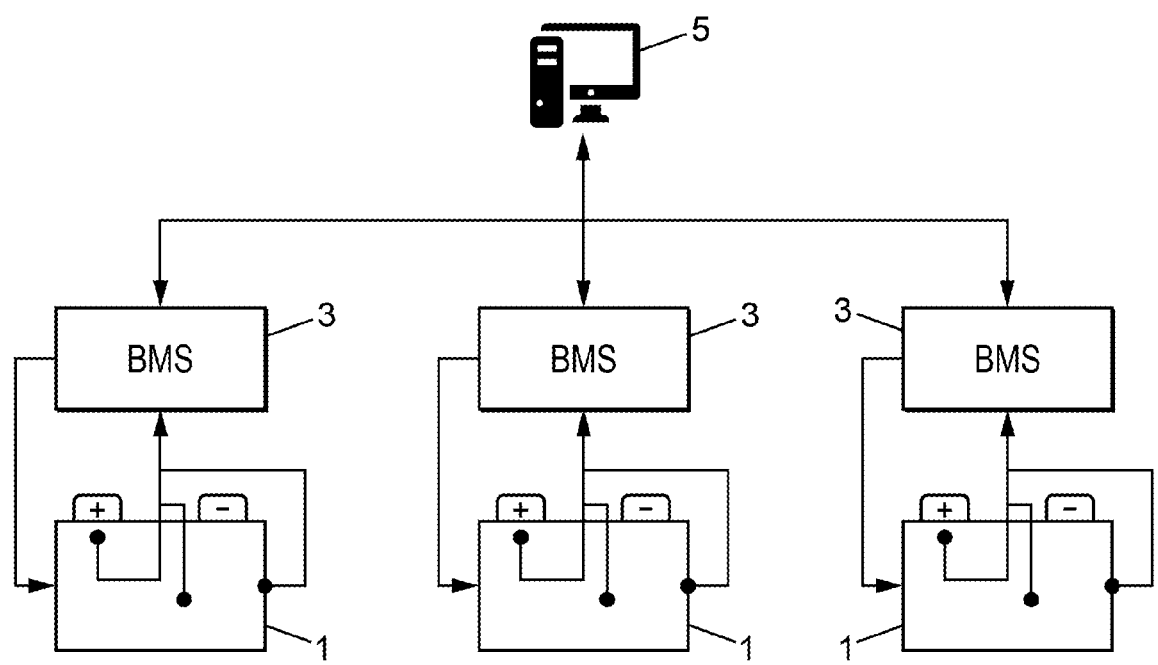
FIG. 1 shows an architecture for managing a plurality of electrochemical systems.

Reference is now made to FIG. 1. FIG. 1 shows an architecture for managing a plurality of electrochemical systems, in which three electrochemical systems 1 are each monitored and controlled by a management device, or PMS 3. The PMS 3 are connected, here remotely, to a common centralized management platform 5. The centralized management platform 5 receives measurement and diagnostic data from each PMS 3 and sends back control instructions.

The centralized management platform 5 comprises at least one processor associated with a memory and arranged to implement a diagnostic method as described below. Alternatively, at least one of the PMSs 3 may be arranged to implement a diagnostic method as described below. Each PMS 3 and/or the centralized management platform 5 therefore comprises computer means for implementing a diagnostic method. Each electrochemical system 1 is composed of a plurality of electrochemical elements electrically connected in series.

Figure 10:
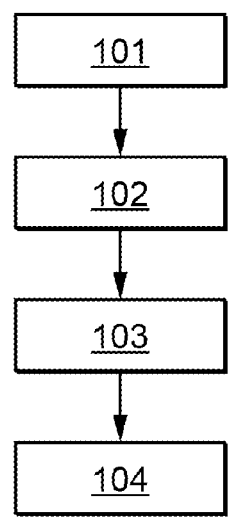
FIG. 10 shows a flowchart for implementing a method.

In a diagnostic method for diagnosing a system 1, shown in FIG. 10, an operation 101 is implemented. Operation 101 comprises:

a. collecting measurement data from the system 1 for a plurality of instants t, said data being timestamped and including, for each instant t, at least:

a voltage $U_t$ and a current $I_t$ across the terminals of the system 1, the maximum voltage $U_{t,max}$, across the terminals of a first electrochemical element $C_{t,1}$, among the voltages across the terminals of each of the electrochemical elements, associated with an identifier of said first electrochemical element $C_{t,1}$, the minimum voltage $U_{t,min}$, across the terminals of a second electrochemical element $C_{t,2}$, among the voltages across the terminals of each of the electrochemical elements, associated with an identifier of said second electrochemical element $C_{t,2}$.

In the example described here, the data are collected by the centralized management platform 5 via the PMS 3 connected to the system 1. Alternatively, the data are collected directly at the PMS 3 or at the system 1. In these cases, additional data may be collected, such as the mean state of charge. In some embodiments, the instants t when the measurements are made on the system are distributed over a plurality of complete or partial charge and/or discharge cycles of the system 1. In other words, the data collected may not correspond to the same charge/discharge cycle. Thus, the amount of data collected may be significant, including in the event of an anomaly or a temporary abnormality in the measurements. In addition, by working over a plurality of cycles and subsequently applying data processing (filters, elimination of abnormal data, means, etc.), it is easy to reduce the effect of bias in the diagnostics performed on the basis of such data. The relevance and reliability of the measurements are improved. Alternatively, for example when the charge/discharge phases are widely spread out over time and/or when it is desired to obtain diagnostic results very quickly, the data collected may correspond to a same charge/discharge cycle, or may even be collected and processed in real time, during functional operation of the system.

Reference is now made to FIGS. 2 through 9. FIGS. 2 through 9 are graphical representations of measured data or data derived from measured data in actual electrochemical systems. They constitute an example of data that can be collected during operation 101. Of course, in the implementation of the method, the collection of data is in no way limited to any graphical representation or form. Also, the examples representing said data in the graphs of the figures are not to be understood as limiting.

FIGS. 2, 4, 6, and 8 each represent the evolution of the voltage across the terminals of particular elements of an electrochemical system as well as a reference voltage $U_t$ over time t during a discharge phase of the system. Thus, the evolution of time t is the opposite of that of the evolution of the SOC of the system (non-linear here). Of course, if a charge phase were represented, the evolution of time t would be in the same direction as the evolution of the SOC of the system (in principle non-linear). In the examples represented, we voluntarily limit ourselves to a single discharge cycle so as not to clutter the graph. As explained above, all the data collected could concern measurements made over a charge cycle and a discharge cycle, or even over several cycles for example, including partial cycles (incomplete charges or discharges).

Figure 2:
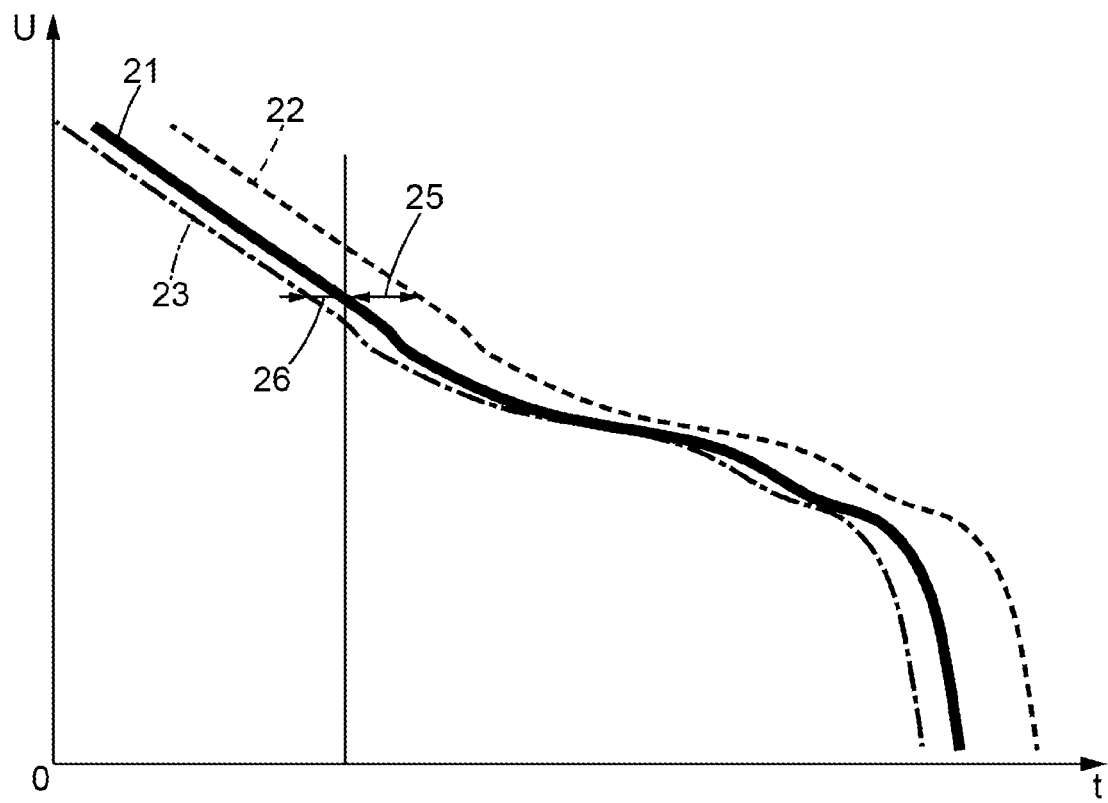
FIG. 2 shows the voltages of several elements of a same electrochemical system during discharge of the system.
Figure 3:
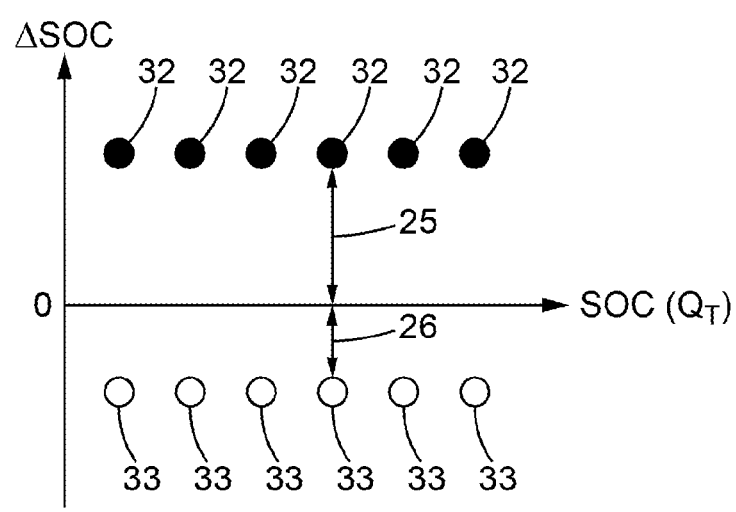
FIG. 3 shows the extrema of the SOC differences relative to the SOC mean of the system, for the system elements in the previous figure as a function of the SOC of the system.
Figure 4:
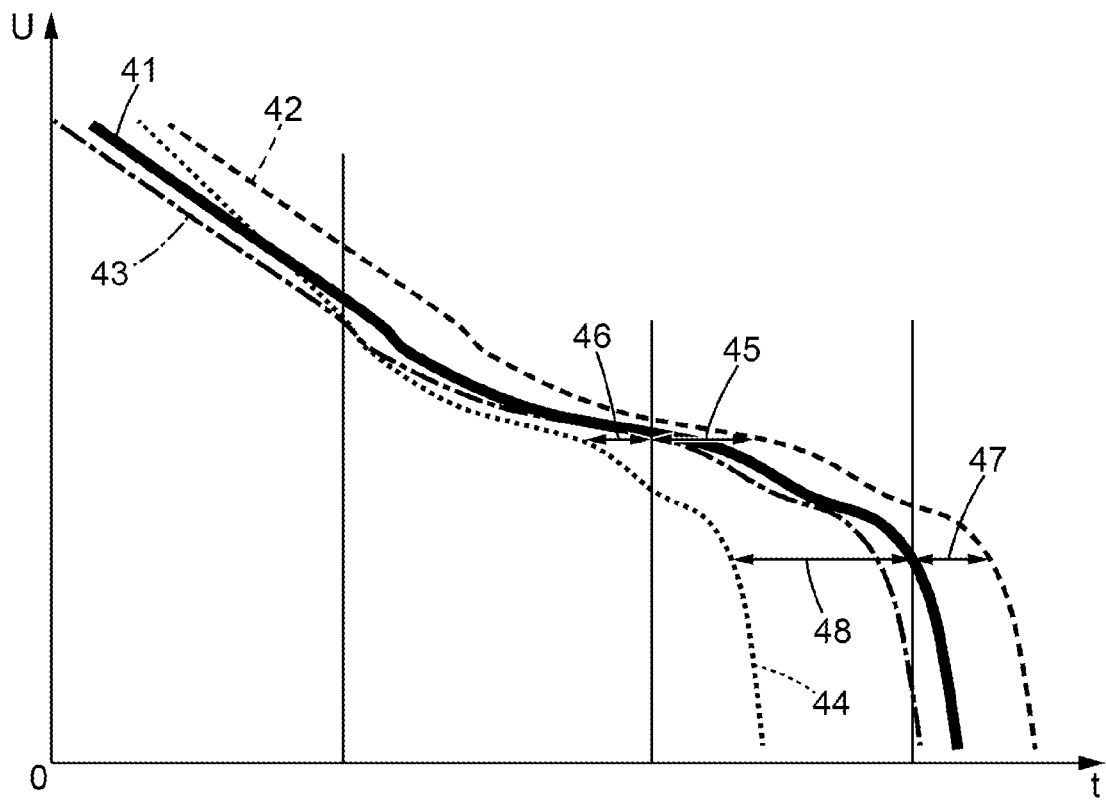
FIG. 4 shows the voltages of several elements of a same electrochemical system during discharge of the system.
Figure 5:
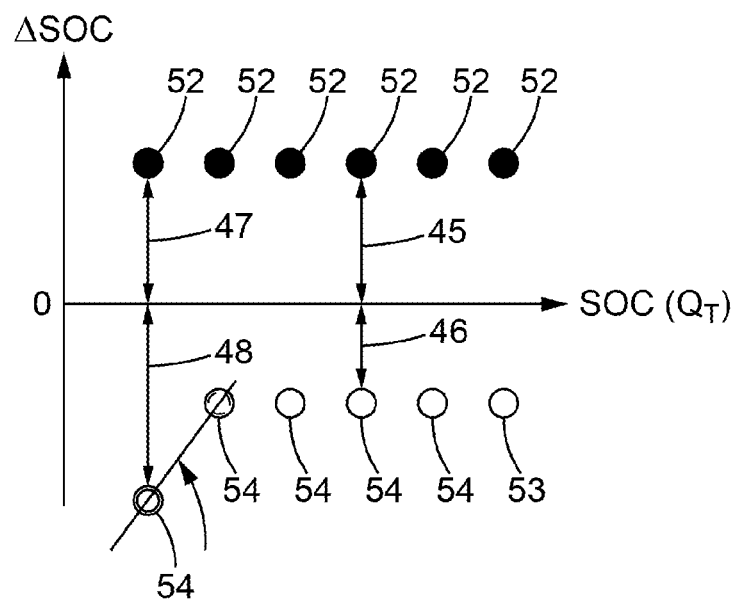
FIG. 5 shows the extrema of the SOC differences relative to the SOC mean of the system, for the system elements in the previous figure as a function of the SOC of the system.
Figure 6:
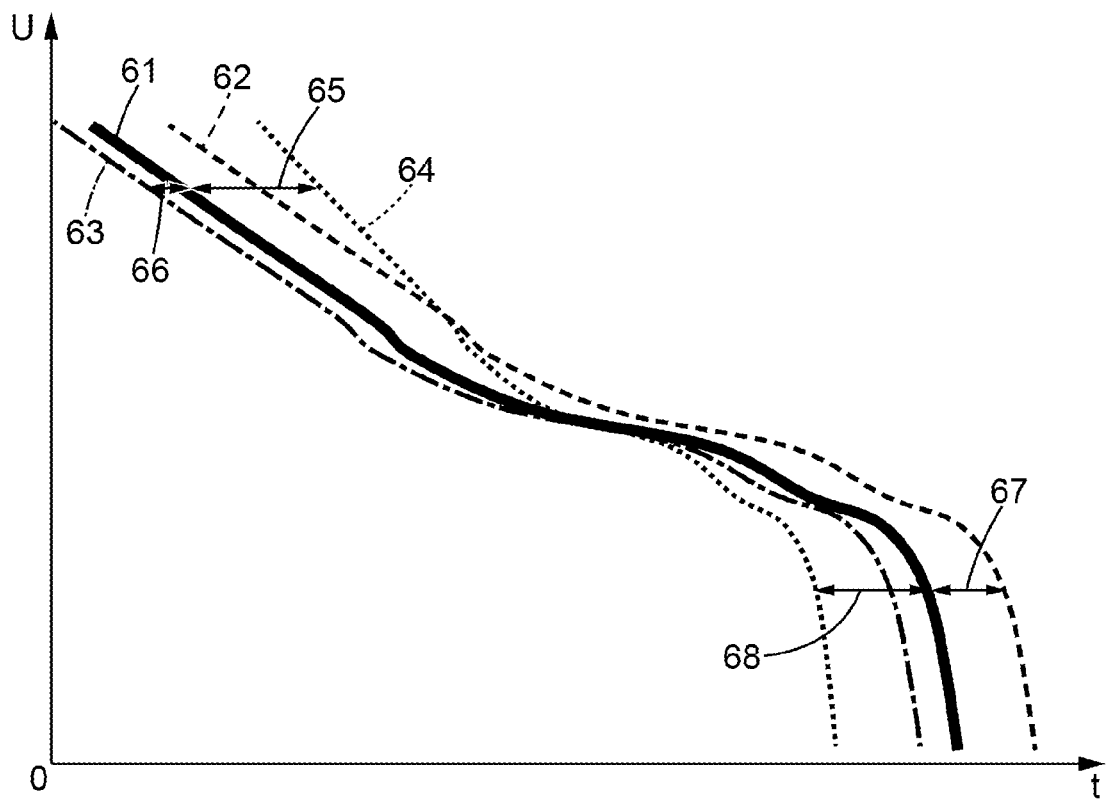
FIG. 6 shows the voltages of several elements of a same electrochemical system during discharge of the system.
Figure 7:
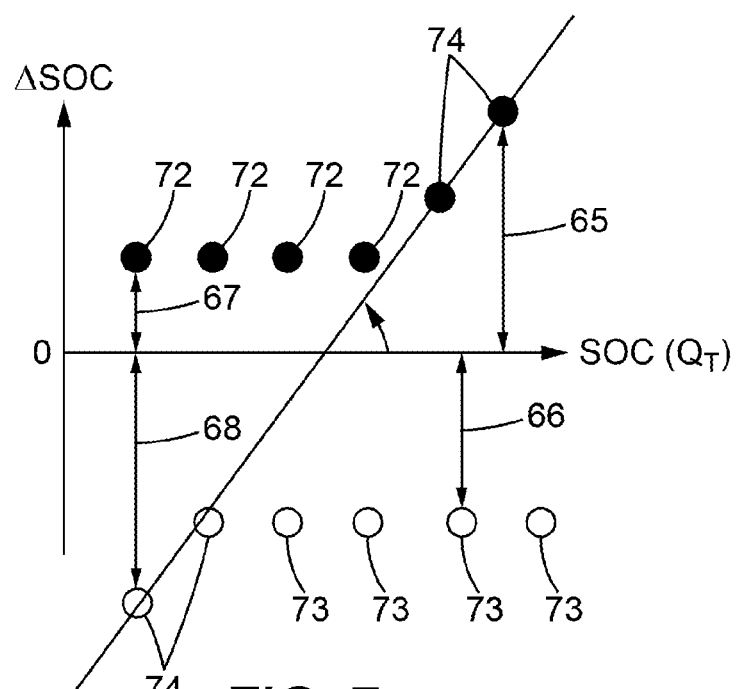
FIG. 7 shows the extrema of the SOC differences relative to the SOC mean of the system, for the system elements in the previous figure as a function of the SOC of the system.
Figure 8:
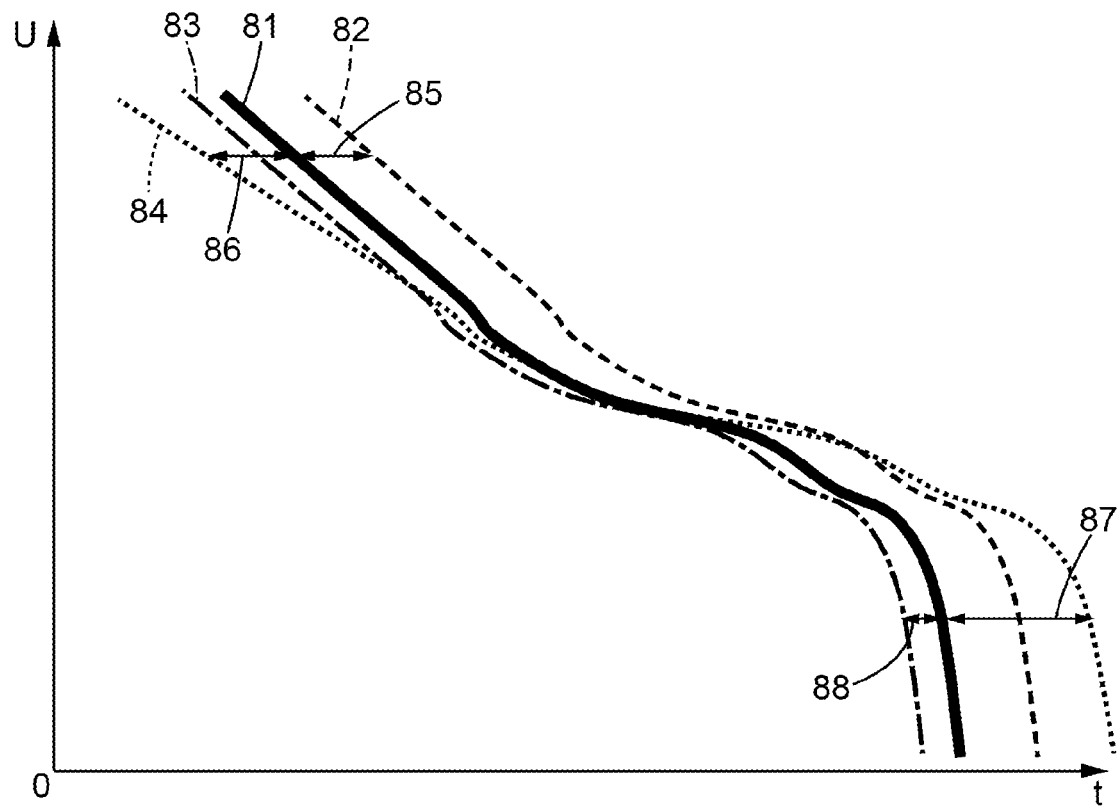
FIG. 8 shows the voltages of several elements of a same electrochemical system during discharge of the system.
Figure 9:
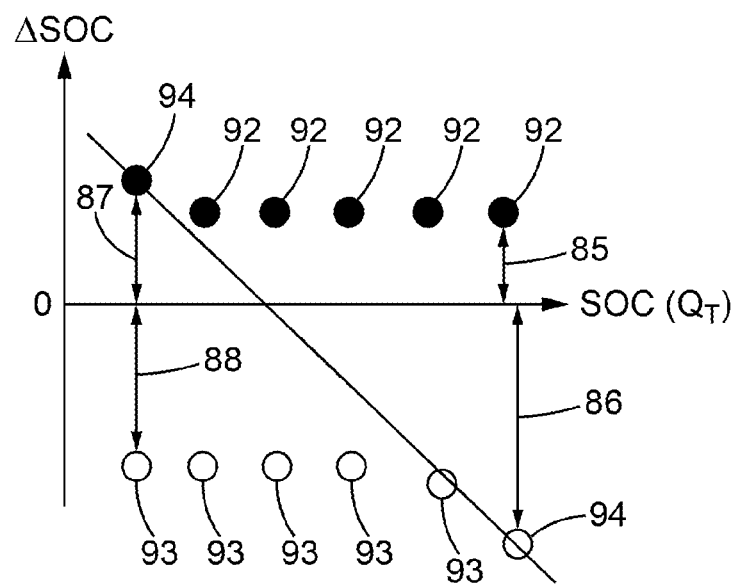
FIG. 9 shows the extrema of the SOC differences relative to the SOC mean of the system, for the system elements in the previous figure as a function of the SOC of the system.

FIGS. 2 and 3 correspond to an electrochemical system (a situation) in which the component elements of the system have identical SOHs (having identical residual capacities) but having an imperfect imbalance. Unlike the following examples, the system does not include a weak or strong element. FIGS. 4 and 5 correspond to an electrochemical system (a situation) in which there is a "weak element", i.e. a cell with a significantly lower residual capacity than the other cells in the system. There is also an imperfect imbalance. FIGS. 6 and 7 also correspond to an electrochemical system (a situation) in which there is a "weak element", i.e. a cell with a significantly lower residual capacity than the other cells in the system. There is also an imperfect imbalance. FIGS. 8 and 9 correspond to an electrochemical system (a situation) in which there is a "strong element", i.e. a cell with a significantly higher residual capacity than the other cells in the system. There is also an imperfect imbalance.

Respectively in FIGS. 2, 4, 6, and 8:
the reference voltage curve is respectively denoted 21, 41, 61, or 81;
the voltage curve of an element having a high voltage across its terminals compared to the other elements of the system, is respectively denoted 22, 42, 62, or 82;
the voltage curve of an element having a low voltage across its terminals compared to the other elements of the system, is respectively denoted 23, 43, 63, or 83.

In FIGS. 4 and 6, the voltage curve of the weak element is respectively denoted 44 and 64. In FIG. 8, the voltage curve of the strong element is denoted 84.

In FIGS. 2, 4, 6, and 8, double arrows denoted 25, 45, 47, 65, 67, 85 and 87 graphically represent, for a given instant t (or a given SOC of the system), a state of charge deviation $\Delta Q_{t,max}$ of the element having the highest state of charge of the system compared to the reference state of charge $Q_t$ of the system. Double arrows denoted 26, 46, 48, 66, 68, 86 and 88 graphically represent, for these same given instants t (or given SOCs of the system), a state of charge deviation $\Delta Q_{t,min}$ of the element having the lowest state of charge of the system compared to the reference state of charge $Q_t$ of the system. In these examples, the reference voltage corresponds to the voltage $U_t$ across the terminals of the system as a whole, divided by the number of component elements of the system. The reference voltage is therefore an average. Alternatively, the reference voltage may be calculated differently, in particular as a function of the values available for deducing it and/or by applying corrective factors. The reference voltage may for example take the form of quantiles such as a median, or as a weighted mean, or as a combination of such functions.

FIGS. 2, 4, 6, and 8 represent evolutions of voltages across the terminals of particular elements compared to the evolution of a reference voltage, during a discharge phase and for known scenarios (absence or existence of a strong or weak element). It is therefore understood that these figures have an explanatory purpose but do not necessarily correspond to the data initially known in a real situation: on the contrary, the absence or existence and the identification of strong and/or weak elements is precisely one of the purposes of the diagnostic methods described herein. Similarly, the set of voltages across the terminals of each of the elements over time may not all be part of the data available and collected in step 101. In the examples that follow, only the maximum voltage $U_{t,max}$, respectively minimum voltage $U_{t,min}$, among the voltages across the terminals of each of the electrochemical elements are collected and associated with an identifier of each of the two electrochemical elements $C_{t,1}$ and $C_{t,2}$ concerned.

In a diagnostic method for diagnosing a system 1, after operation 101, an operation 102 is implemented. Operation 102 comprises:

b. deducing, from at least part of the measurement data collected in step 101, for each instant t:
 a reference state of charge $Q_t$ of the system 1,
 a first state of charge deviation $\Delta Q_{t,max}$ of the first element $C_{t,1}$ relative to the reference state of charge $Q_t$ of the system 1,
 a second state of charge deviation $\Delta Q_{t,min}$ of the second element $C_{t,2}$ relative to the reference state of charge $Q_t$ of the system 1.

These data are deduced in a manner that obtains, for each instant t, a set of data $Q_t$, $\Delta Q_{t,max}$, $\Delta Q_{t,min}$, $C_{t,1}$, $C_{t,2}$, associated with a pair of elements of interest that is formed of the first and second elements $C_{t,1}$, and $C_{t,2}$. In some variants, the data set obtained may further comprise data associated with a reference element of the system.

In a diagnostic method for diagnosing a system 1, after operation 102, an operation 103 is implemented. Operation 103 comprises:

c. grouping the data sets $Q_t$, $\Delta Q_{t,max}$, $\Delta Q_{t,min}$, $C_{t,1}$, $C_{t,2}$ by ranges of values T of the reference state of charge $Q_t$ of each data set, so as to retain a representative data set T, $\Delta Q_{T,max}$, $\Delta Q_{T,min}$, $C_{T,1}$, $C_{T,2}$, by ranges of values T of the reference state of charge.

The data grouping (or aggregation) operation makes it possible to obtain information on imbalances in the charge/discharge state, no longer only timewise in the absolute, but for the state of charge (SOC) as well. Such grouping smoothes and reduces the biases caused by possible heterogeneity in the number and quality of the data measured over the complete state of charge range of the system. For example, an actual electrochemical system during operation may often oscillate (charge-discharge cycles) between a 20% and 100% state of charge (SOC) because, for obvious practical reasons, one wishes to avoid fully discharging the system. In this case, the number of measurements available and collected for a state of charge of between 0% and 20% and beyond 100% (beyond the theoretical maximum value) is significantly lower than for the ranges 20%-40%; 40%-60%; 60%-80%; and 80%-100%. Grouping the data by the state of charge of the system then makes it possible to smooth out the influence of the data, for example by filtering certain data and/or by applying weights in subsequent processing of the data. Thus, the "retaining" of a representative data set by ranges of values of the reference state of charge can be implemented in various ways. In an algebraic form, a plurality of data sets collected for a state of charge range can be converted, for example, into a mean, a weighted mean, or quantiles such as a state of charge deviation median. A filter may be applied to exclude values beyond predefined absolute or relative thresholds. Relative threshold is understood here to mean a threshold that depends on the distribution of the values obtained, such as 110% of the mean or the sum of the mean and a standard deviation, or a combination of such values. A single collected value may be retained. In geometric form, a point cloud can be converted into a point representing the barycenter of the cloud. Similarly, when several identifiers are obtained for a maximum or minimum value of the state of charge deviation, the identifiers may or may not be retained depending on the frequency of their appearance. For example, only the identifier with the greatest occurrence may be retained, or only the two identifiers with the two greatest occurrences may be retained, etc.

To simplify one's understanding, for the rest of the diagnostic method it is then considered that a single maximum state of charge deviation value and a single minimum state of charge deviation value is retained for each state of charge range. Alternatively, a plurality of data may be retained each time and processed separately thereafter. In particular, several minimum or maximum state of charge deviation values for a state of charge range may be assigned different functions in the rest of the diagnosis, in particular when several identifiers are retained for each maximum/minimum as described above.

To illustrate examples of data collected during operation 101 and data deduced during operation 102 then grouped during operation 103, reference is now made to FIGS. 3, 5, 7, and 9.

FIGS. 3, 5, 7, and 9 each represent maximum $\Delta Q_{t,max}$ and minimum $\Delta Q_{t,min}$ state of charge deviations from a reference state of charge Qi, as a function of the reference state of charge of the system. In other words, the reference state of charge Qi corresponds to the abscissa axis (deviation value of zero), the abscissa axis representing the state of charge of the system (SOC). In FIGS. 3, 5, 7, and 9, the references from FIGS. 2, 4, 6, and 8 denoting the double arrows are again used: −25, 45, 47, 65, 67, 85, and 87 for the state of charge deviations $\Delta Q_{t,max}$ of the elements having the greatest state of charge of the system compared to the reference state of charge Qi of the system; −26, 46, 48, 66, 68, 86, and 88 for the state of charge deviations $\Delta Q_{t,min}$ of the elements having the smallest state of charge of the system compared to the reference state of charge Qi of the system.

In the example described here, each of the extrema is also associated (or "tagged") with an identifier of the electrochemical element having the noted state of charge deviation. In FIGS. 3, 5, 7, and 9, the references for the curves of FIGS. 2, 4, 6, and 8 are reused to designate the corresponding points and can therefore be likened to identifiers for the electrochemical elements. Alternatively, when the identifiers are not available or when identifying the elements is not desired, the identifiers may be absent (for example if one only wishes to quantify the extreme residual capacities). In other variants, each of the extrema is associated with the frequency of occurrence of the identifiers rather than with the identifiers themselves.

In a diagnostic method for diagnosing a system 1, after operation 103, an operation 104 is implemented. Operation 104 comprises:

d. assigning to each data pair $C_{T,1}$, $\Delta Q_{T,max}$ and $C_{T,2}$, $\Delta Q_{T,min}$ composed of the identifier of the electrochemical element $C_{t,1}$, $C_{t,2}$ and the corresponding state of charge deviation $\Delta Q_{t,max}$ and $\Delta Q_{t,min}$:
  no diagnostic function,
  or
    at least one of the following diagnostic functions:
    an identification function for identifying at least one electrochemical element having a difference in residual capacity compared to a rated residual capacity of the electrochemical elements of the system, that is within the range of values T of the reference state of charge (hereinafter "weak/strong element identification function");
    a quantification function for quantifying said difference(s) in residual capacity (hereinafter "low/high residual capacity quantification function");
    a quantification function for quantifying the maximum imbalance between the chemical elements of the system (hereinafter "imbalance quantification function").

In some variants, an additional function may be provided: one for identifying the elements involved in the maximum imbalance of the system (hereinafter "imbalance identification function"). Such a function also makes it possible to characterize the limits of the voltage envelope of the elements.

The possibility of assigning no function is particularly relevant in the embodiments where a plurality of values have been retained as the minimum or maximum state of charge deviation for a state of charge range. Not assigning any diagnostic function during operation 104 can then be an alternative to data filtering during operation 103.

The assigning of one or more functions to a data item is carried out according to the relevance of this data item in detecting, identifying, and/or quantifying a type of possible anomaly. In other words, a distinction is made between the values in order to separate the symptoms of a balancing problem from those of a weak or strong element, which will then allow them to be quantified separately. Such a distinction, by the assigning of function(s), is enabled by the comparison with the other values/data, in other words by a relative approach. Indeed, by considering a data item/value in isolation from the others, it is impossible to state whether it results from an imbalance type of anomaly between elements or from the existence of a strong or weak element.

The rules for assigning functions applied during operation 104 may vary between various embodiments. The following rules are given as an example: they may each be applied alone or in combination with each other but are not to be interpreted as limiting.

In some embodiments, the data sets exhibiting a state of charge deviation $\Delta Q_{t,max}$ greater than a limit value $\Delta Q_{t,max.nom}$ are assigned at least one among the "weak/strong element identification" and "low/high residual capacity quantification" functions.

In some embodiments, the data sets exhibiting a state of charge deviation $\Delta Q_{t,min}$ lower than a limit value $\Delta Q_{t,min.nom}$ are assigned at least one among the "weak/strong element identification" and "low/high residual capacity quantification" functions.

A criterion for the occurrence of identifiers $C_{T,1}$; $C_{T,2}$ may additionally be applied. For example, only the data sets for which the identifier has the highest occurrence over all or part of the state of charge of the system are assigned at least one among the "weak/strong element identification" and "low/high residual capacity quantification" functions. Alternatively, only the data sets for which the identifier has the highest occurrence (or strictly greater than 1) among those having a higher $\Delta Q_{t,max}$, respectively lower $\Delta Q_{t,min}$, state of charge deviation that a limit value $\Delta Q_{t,max.nom}$, respectively $\Delta Q_{t,min.nom}$, are assigned at least one among the "weak/strong element identification" and "weak/strong residual capacity quantification" functions. "At least one" of the aforementioned functions is understood here to mean that each pair may be assigned a single function, or several cumulatively. In addition, two pairs of a same range of values (T) of the reference state of charge may each be assigned functions that differ from each other.

In some embodiments, data sets having a state of charge deviation $\Delta Q_{t,max}$ lower than a limit value $\Delta Q_{t,max.nom}$ are assigned the "imbalance quantification" function.

In some embodiments, data sets having a state of charge deviation $\Delta Q_{t,min}$ greater than a limit value $\Delta Q_{t,min.nom}$ are assigned the "imbalance quantification" function.

The aforementioned limit values $\Delta Q_{t,max.nom}$ and/or $\Delta Q_{t,min.nom}$ may be predetermined, or calculated on the basis of the state of charge deviation values of the data sets. For example, the limit values may be predefined absolute or relative limits. Relative limit is understood here to mean a limit value which depends on the distribution of the values obtained such as 110% of the mean or the sum of the mean and a standard deviation, or a combination of such values. The limit values $\Delta Q_{t,max.nom}$ and/or $\Delta Q_{t,min.nom}$ may be:

identical for assigning the "weak/strong element identification" and "weak/strong residual capacity quantification" functions on the one hand and the "imbalance quantification" function on the other hand, so that each data set is assigned either only the "weak/strong element identification" and "weak/strong residual capacity quantification" functions, or only the "imbalance quantification" function, and optionally the "imbalance identification" function; or different for assigning the "weak/strong element identification" and "weak/strong residual capacity quantification" functions on the one hand and the "imbalance quantification" function on the other hand, so that certain data sets are assigned both the "weak/strong element identification" and "weak/strong residual capacity quantification" functions, as well as the "imbalance quantification" function, or none of these functions.

In some embodiments, the step 104 of assigning functions constitutes the final step of the diagnostic method. The obtaining of data thus affiliated with a "weak/strong element identification" and/or "weak/strong residual capacity quantification" function is sufficient to deduce that the system comprises at least one element presenting an anomaly of the strong or weak residual capacity type. In addition, the identifier associated with this data further makes it possible to identify, in the system, the element or elements having a strong or weak residual capacity. Conversely, the absence of data affiliated with a "weak/strong element identification" or "weak/strong residual capacity quantification" function at the end of operation 104 indicates the absence of an element having a strong or weak residual capacity, which is a diagnosis in itself.

In some embodiments, when data are obtained with associated "weak/strong element identification" and/or "weak/strong residual capacity quantification" functions, an additional operation of quantifying a residual capacity anomaly is implemented. For example, the data pairs $C_{T,1}$, $\Delta Q_{T,max}$ and $C_{T,2}$, $\Delta Q_{T,min}$ consisting of the identifier of the electrochemical element $C_{t,1}$ or $C_{t,2}$ and the corresponding state of charge deviation $\Delta Q_{t,max}$ or $\Delta Q_{t,min}$ are used together in constructing a linear regression model (see FIGS. 5, 7, and 9). Quantification of a residual capacity anomaly is then obtained as a function of the slope value of said linear regression model. Alternatively, means other than linear regression may be implemented to quantify a residual capacity (relative to a reference element). For the data pairs with which the "weak/strong element identification" function is associated, the identifier having the highest occurrence (or the unique identifier) for the maximum and for the minimum state of charge can be retained as the identifier of the strong element, respectively of the weak element. Alternatively, the distribution of identifiers may be used to identify more than one strong element or more than one weak element.

In some embodiments, when data is obtained with which the "imbalance quantification" function is associated, an additional operation of quantifying said imbalance is implemented. For example, the state of charge deviation values $\Delta Q_{t,max}$ or $\Delta Q_{t,min}$ are used to calculate a mean, possibly weighted, or quantiles such as a median, of the values of the first and second charge deviations $\Delta Q_{t,max}$ and $\Delta Q_{t,min}$ respectively. The distribution of data with which the "imbalance quantification" or "imbalance identification" functions are associated, may optionally be used to quantify the reliability (or "robustness") of said identification/quantification.

In some embodiments, the diagnostic method may comprise, in addition to and after the operations described above, an "warning" operation. For example:

e. generating at least one of the following anomaly signals on the basis of the data obtained:

an identification of at least one electrochemical element having a difference in residual capacity compared to a rated residual capacity of the electrochemical elements of the system within the range of values of the reference state of charge;

a quantification of said difference(s) in residual capacity;

a quantification of the maximum imbalance between the chemical elements of the system.

In the variants in which an "imbalance identification" function is provided, the at least one anomaly signal may include at least one identification of an element involved in the imbalance.

In other words, the output from the diagnostic method may be in the form of a diagnosis intended for operators responsible for monitoring and performing maintenance on the system, including operators who are not able to interpret the numerical data themselves.

Optionally, the output from the diagnostic method may be in the form of a signal for triggering at least one corrective measure in response to at least one of the aforementioned diagnoses. In this case, the method becomes more than a diagnostic method but more generally a method for maintaining electrochemical systems that is at least partly automated. For example, a feedback signal may be provided to initiate (electrical) isolation of a faulty item or of a system subassembly containing a faulty item.

INDUSTRIAL APPLICATION

These technical solutions can be applied to all types of batteries or accumulators and in particular to Li-ion type batteries that are stationary (for networks or households for example) or carried onboard (vehicles for example).

In conclusion, the embodiments of the method described above make it possible to avoid requiring measurement data specific to each of the component elements of a system, but on the contrary only requiring more conventional measurement data, in particular relating to extreme values rather than each value of each element. Thus, and in contrast to many existing methods, it is not necessary to perform onerous calculations and a complete diagnosis for each element of the system in order to then compare the elements to each other. The method described here makes it possible to quantify a residual capacity in relative terms (compared to a reference residual capacity), which is sufficient in most cases for identifying an anomaly.

In addition, according to known methods, the identification (and not the quantification) of an element having a weaker/stronger residual capacity than the average consists of analyzing the frequency of appearance of the identifiers corresponding to the elements at minimum or maximum voltage over time. This implies the underlying assumption that, over a given period, the weakest element will be the one most often associated with the minimum or maximum voltage of the assembly. However, in this approach the result is a function of the time the system spends in each state of charge. Indeed, in practice, the cell associated with the minimum voltage is not necessarily the same at half-charge and at full charge, for example. Consequently, in an approach based on the frequency of occurrence, the state of charge areas where the system spends the most time will be overweighted. In contrast, the method proposed here, based on a state of charge approach rather than on a strictly temporal one, allows identification and quantification of the weak/strong residual capacities per state of charge slice: this is more relevant for addressing a problem linked by its very nature to the capacity of the elements and therefore to their state of charge. In particular, the weighting biases generated by conventional time-based approaches are eliminated here.

As for quantifying the imbalance in the state of charge, this diagnostic is a fairly rare in the prior art. In practice, the balancing circuit (most of the time passive balancing by energy dissipation in resistors) is simply activated at the voltage threshold criterion. In this case, no prior quantification of the imbalance is performed. A more advanced approach relies on performing the balancing after quantification of each cell's need for balancing. Thus, an estimate of the SOC deviation between the elements is made for each of the cells in order to apply a balancing suitable for each. Such an approach is based, for example, on calculating the SOC at an element (a cell). This approach is not possible when data is not available for each element.

In addition, the methods known thus far are often based on ad-hoc diagnostics at a given time. In contrast, the proposed method is based on a limited quantity of data but concerning a duration (a history), for example covering several days, which allows taking advantage of a greater variety of actual situations and states of the system. However, the proposed method can be implemented in real time, for example over a sliding window of time ending at the present moment.

Finally, traditional approaches treat the issues of imbalance and lower residual capacity independently, which can lead to confusion. Indeed, when examined at a given moment, an element's deviation in voltage from the average can just as easily be explained by a weak element as by an imbalance. The proposed method, by being encompassing and by exploiting a large data history, makes it possible to obtain a more precise and better quality diagnosis.

The applicant has applied the described method to a "healthy" system (presenting only imbalances) and to a faulty system (weak elements and imbalances). The method was applied during various periods of time and in differing operating states of the systems, without this affecting the good repeatability of the results. Analysis of the healthy system allowed quantifying the high and low imbalances with an estimation repeatability on the order of ±0.25% SOC (in absolute terms) over time windows that are independent of each other. Analysis of the faulty system allowed quantifying the high and low imbalances with an estimation repeatability on the order of ±0.5% SOC (in absolute terms) as well as quantifying the residual capacity of the weak element with a variability on the order of ±20% (in relative terms), which is a sufficient order of magnitude for detecting a weak element.

This disclosure is not limited to the exemplary methods, computer programs, and non-transitory computer-readable storage medium described above solely by way of example, but encompasses all variants conceivable to those skilled in the art within the context of the protection sought.

LIST OF REFERENCE NUMBERS

11: Electrochemical system
33: PMS
55: centralized management platform
21: reference voltage curve
22: voltage curve of an element
23: voltage curve of an element
25: state of charge deviation $\Delta Q_{t,max}$
32: element identifier
33: element identifier
41: reference voltage curve
42: voltage curve of an element
43: voltage curve of an element
44: voltage curve of a weak element
45: state of charge deviation $\Delta Q_{t,max}$
46: state of charge deviation $\Delta Q_{t,min}$
47: state of charge deviation $\Delta Q_{t,max}$
48: state of charge deviation $\Delta Q_{t,min}$
52: element identifier
53: element identifier
54: element identifier
61: reference voltage curve
62: voltage curve of an element
63: voltage curve of an element
64: voltage curve of a weak element
65: state of charge deviation $\Delta Q_{t,max}$
66: state of charge deviation $\Delta Q_{t,min}$
67: state of charge deviation $\Delta Q_{t,max}$
68: state of charge deviation $\Delta Q_{t,min}$
72: element identifier
73: element identifier
74: element identifier
81: reference voltage curve
82: voltage curve of an element
83: voltage curve of an element
84: voltage curve of a strong element
85: state of charge deviation $\Delta Q_{t,max}$
87: state of charge deviation $\Delta Q_{t,max}$
86: state of charge deviation $\Delta Q_{t,min}$
88: state of charge deviation $\Delta Q_{t,min}$
92: element identifier
93: element identifier
94: element identifier
101: collection operation
102: deduction operation
103: grouping operation
104: function assignment operation(s)

The invention claimed is:

1. A method for diagnosing an actual electrochemical system, implemented by computer means, said system being composed of a plurality of electrochemical elements electrically connected in series, the method comprising:
  a. collecting measurement data from the system at a plurality of instants, said data being timestamped and including, for each instant, at least:
    a voltage and a current across the terminals of the system,
    a first voltage, across the terminals of a first electrochemical element, corresponding to the highest voltage among the voltages across the terminals of each of the electrochemical elements of the system considered at said instant, said first voltage being associated with an identifier of said first electrochemical element, a second voltage, across the terminals of a second electrochemical element, corresponding to the lowest voltage among the voltages across the terminals of each of the electrochemical elements of the system considered at said instant, said second voltage being associated with an identifier of said second electrochemical element, b. deducing, from said measurement data, for each instant:

a reference state of charge of the system, a first state of charge deviation of the first element relative to the reference state of charge of the system, a second state of charge deviation of the second element relative to the reference state of charge of the system, so as to obtain, for each instant, a data set associated with a pair of elements of interest formed of the first and second elements, c. grouping the data sets by ranges of values of the reference state of charge of each data set, so as to retain a representative data set by ranges of values of the reference state of charge, d. assigning to each data pair composed of the identifier of the electrochemical element and the corresponding state of charge deviation:

no diagnostic function, or at least one of the following diagnostic functions:

an identification function for identifying at least one electrochemical element having a difference in residual capacity compared to a rated residual capacity of the electrochemical elements of the system, that is within the range of values of the reference state of charge;

a quantification function for quantifying said difference(s) in residual capacity;

a quantification function for quantifying an imbalance between the chemical elements of the system.

2. The method according to claim 1, wherein the grouping of the data sets comprises calculating, for each range of values of the state of charge:

a first representative value of the first state of charge deviations deduced from the measurement data, said first representative value corresponding to an unweighted mean, a weighted mean, or quantiles, such as a median, of the first state of charge deviations, and a second representative value of the second state of charge deviations deduced from the measurement data, said second representative value corresponding to an unweighted mean, a weighted mean, or a median, of the second state of charge deviations, said first and second representative values calculated for each range of values of the state of charge being those retained for the assignment of diagnostic functions or of no diagnostic function.

3. The method according to claim 1, wherein the number of occurrences of the identifiers of the electrochemical elements among the measurement data collected is a parameter in assigning diagnostic functions or in assigning no diagnostic function.

4. The method according to claim 1, wherein each data pair composed of the identifier of the electrochemical element and the corresponding state of charge deviation may also be assigned the following function:

an identification function for identifying the elements involved in the imbalance between the chemical elements of the system.

5. The method according to claim 1, further comprising a diagnostic step:

e. generating at least one of the following anomaly signals on the basis of the data pairs composed of the identifier of the electrochemical element and the corresponding state of charge deviation:

an identification of at least one electrochemical element having a difference in residual capacity compared to a rated residual capacity of the electrochemical elements of the system within the range of values of the reference state of charge;

a quantification of said difference(s) in residual capacity;

a quantification of the imbalance between the chemical elements of the system.

6. The method according to claim 5, further comprising a step of triggering at least one corrective measure in response to at least one of said anomaly signals.

7. The method according to claim 1, wherein the data pairs composed of the identifier of the electrochemical element and the corresponding state of charge deviation to which a quantification function for quantifying said difference(s) in residual capacity is assigned, are used together in constructing a linear regression model, then a quantification of a residual capacity anomaly is implemented as a function of the slope value of said linear regression model.

8. The method according to claim 1, wherein the data pairs composed of the identifier of the electrochemical element and the corresponding state of charge deviation to which a quantification function for quantifying the imbalance between the chemical elements of the system is assigned, are used together to calculate a mean, weighted or not, or quantiles, such as a median, of the values of the first and second state of charge deviations.

9. The method according to claim 1, wherein said data sets are obtained for a plurality of instants distributed over a plurality of charge and/or discharge cycles, complete or partial, of said electrochemical system.

10. A computer program comprising instructions for implementing the method according to claim 1 when this program is executed by a processor.

11. A non-transitory computer-readable storage medium on which is stored a program for implementing the method according to claim 1 when this program is executed by a processor.

* * * * *